United States Patent
Martin et al.

(10) Patent No.: US 12,466,350 B2
(45) Date of Patent: Nov. 11, 2025

(54) AUDIO SIGNALING SYSTEM AND METHOD FOR AUTONOMOUS VEHICLES

(71) Applicant: Kubota Corporation, Osaka (JP)

(72) Inventors: Kyle Alan Martin, Tempe, AZ (US); Edwin Ernest Wilson, Arlington, TX (US)

(73) Assignee: Kubota Corporation, Osaka (JP)

( * ) Notice: Subject to any disclaimer, the term of this patent is extended or adjusted under 35 U.S.C. 154(b) by 293 days.

(21) Appl. No.: 18/227,150

(22) Filed: Jul. 27, 2023

(65) Prior Publication Data

US 2024/0034257 A1  Feb. 1, 2024

Related U.S. Application Data

(60) Provisional application No. 63/393,001, filed on Jul. 28, 2022.

(51) Int. Cl.
*H04B 15/00* (2006.01)
*B60R 16/037* (2006.01)
*G05D 1/00* (2024.01)
*G10L 15/22* (2006.01)

(52) U.S. Cl.
CPC .......... *B60R 16/0373* (2013.01); *G10L 15/22* (2013.01)

(58) Field of Classification Search
CPC ............................ B60R 16/0373; G10L 15/22
USPC .......................... 381/124, 94.1–94.3; 701/27
See application file for complete search history.

(56) References Cited

U.S. PATENT DOCUMENTS

| | | |
|---|---|---|
| 8,437,901 B2 | 5/2013 | Anderson |
| 8,538,035 B2 * | 9/2013 | Every ................ H04R 3/002 381/94.2 |
| 8,639,408 B2 | 1/2014 | Anderson |
| 8,781,137 B1 * | 7/2014 | Goodwin ............ G10L 21/0208 381/94.1 |
| 9,779,557 B2 * | 10/2017 | Hauser .................. G07C 5/008 |
| 10,176,596 B1 * | 1/2019 | Mou ..................... G01S 17/931 |
| 10,197,407 B2 | 2/2019 | Mouthaan et al. |
| 10,254,759 B1 * | 4/2019 | Faust ..................... B60W 30/00 |
| 10,401,866 B2 * | 9/2019 | Rust ..................... G05D 1/0276 |
| 11,300,976 B2 | 4/2022 | Tomita et al. |
| 11,866,063 B2 * | 1/2024 | Almeida ................. G10L 15/22 |
| 2010/0057511 A1 | 3/2010 | Mansouri et al. |
| 2011/0025454 A1 | 2/2011 | Pomerantz et al. |
| 2017/0300059 A1 * | 10/2017 | Rust ..................... G05D 1/0231 |
| 2018/0299841 A1 * | 10/2018 | Appu .................. G05B 13/0285 |
| 2018/0300964 A1 * | 10/2018 | Lakshamanan ........ G06F 9/5027 |
| 2018/0350357 A1 * | 12/2018 | Pandey .................. G10L 15/20 |
| 2020/0151043 A1 * | 5/2020 | Chertov ................ G06F 11/079 |

(Continued)

FOREIGN PATENT DOCUMENTS

| | | |
|---|---|---|
| CA | 2131505 A1 | 3/1996 |
| EP | 3451813 B1 | 10/2020 |

(Continued)

*Primary Examiner* — William J Deane, Jr.
(74) *Attorney, Agent, or Firm* — Hitchcock Evert LLP

(57) ABSTRACT

An audio signaling system for automated machines facilitates action controls for a machine or fleet of machines. The audio signaling system may use audio tones and audio recognition for specified actions such as emergency stops. The system may include a field audio output system and onboard audio control systems. Audio control systems may include audio recognition and be integrated with automation control systems.

24 Claims, 5 Drawing Sheets

(56) References Cited

U.S. PATENT DOCUMENTS

| | | |
|---|---|---|
| 2020/0159220 A1 | 5/2020 | Hurd et al. |
| 2021/0193162 A1* | 6/2021 | Hook .................... G10L 17/00 |
| 2021/0203573 A1 | 7/2021 | Miura et al. |
| 2021/0334645 A1* | 10/2021 | Pardeshi ................ G10L 25/51 |
| 2022/0035029 A1 | 2/2022 | Wang et al. |
| 2022/0078960 A1 | 3/2022 | Okura et al. |
| 2022/0095526 A1 | 3/2022 | Shen et al. |
| 2025/0054389 A1* | 2/2025 | Pullagurla ............ G08G 1/0145 |

FOREIGN PATENT DOCUMENTS

| | | |
|---|---|---|
| GB | 2359335 A | 8/2001 |
| JP | 7138210 B2 | 9/2022 |
| WO | 2016076320 A1 | 5/2016 |
| WO | 2018142899 A1 | 8/2018 |

* cited by examiner

AUDIO SIGNALING SYSTEM AND METHOD FOR AUTONOMOUS VEHICLES

CROSS-REFERENCE TO RELATED APPLICATIONS

This application claims the benefit of priority from U.S. Provisional Patent Application No. 63/393,001 filed on Jul. 28, 2022, which is incorporated herein by reference.

FIELD OF THE DISCLOSURE

The invention relates generally to automated vehicle and machine activities and control systems.

BACKGROUND

Autonomous mobile machines are designed to accomplish specific projects in a directed plan without human interaction or with limited human oversight. These machines use communication networks, such as cellular networks and radio frequency networks, to receive external control information from a human or a program system. In some cases, multiple autonomous machines are working on a single mission, but are constrained to work in a specified zone to prevent direct interaction with other machines within the mission.

Machine automation systems (e.g., vehicle automation systems) use an onboard operations system to drive and manage the machine (e.g., the vehicle). The system may also include onboard sensors to identify and avoid potential obstacles and provide feedback for driving and operating the machine.

Some machines may include emergency shut off systems for circumstances detected by the machine's sensors. The emergency shut off system may also be initiated by human instruction received through the communication channels.

SUMMARY

The present disclosure provides a system for initiating actions, such as emergency stops, using audible tones. This allows control features for autonomous machines across a large area, which may include dead zones for traditional communication networks. In addition, autonomous machines may be controlled through the audible tone when network communication systems are unavailable, fail, or become unavailable. Autonomous machines that do not have communication systems or only have short-range communication systems may be controlled through audible tone signals.

In some embodiments, the audio signaling system may include a field audio system to emit one or more specified audio tones, and a machine with an audio control system and an automation control system. The field audio system may emit one or more specified audio tones indicating an action instruction. The machine's audio control system may receive an audio input and evaluate audio signals. In some embodiments, the audio control system is part of the automation control unit configured to operate the machine. In other embodiments, the audio control system sends action instructions from evaluated audio feeds to the automation control unit for the machine. The automation control unit may then perform an action associated with the action instruction.

Embodiments of the field audio system may include an audio control hub and at least one audio output device. The audio control hub may include a physical control, such as a button, lever, switch or other control device, to manually initiate an audio output. The audio control hub may also include wired or wireless connectivity options to receive a remote initiation signal to initiate the audio output. In some embodiments, the control hub may receive initiation signals from automated systems. In some embodiments, the control hub may initiate audio signals based on local sensor information.

The audio control hub may be operatively connected to one or more audio outputs, such as speakers, bells or other devices. The audio output devices may emit the audible tone or tone pattern indicating a specified action associated with the initiated control. The audible tone or tone pattern may be provided for a set time or over a set period based on the intended action and operational area affected.

Some embodiments of the machine's audio control system include at least one audio input device, such as a microphone, that captures sound. The audio input device may be connected to an audio recording system and analog-to-digital converter.

In some embodiments, the audio control system includes a signal evaluation and detection system to identify any specified audio instruction signals. In some embodiments, the signal evaluation and detection system may analyze the analog audio signal directly. In some embodiments, the signal evaluation and detection system may conduct a digital analysis of the converted audio signal.

In some embodiments, the audio feed from the audio input device is loaded into a windowed audio buffer. Once the buffer is full, the system conducts a signal detection evaluation on the windowed audio buffer to determine whether an action signal tone is present in the windowed audio buffer. If the action signal tone is detected, the audio control system initiates the action conduct through an associated automation control system.

If an action signal tone is not detected, the audio control system refreshes the windowed audio buffer by removing a portion of the audio recording from the end on the windowed audio buffer so that new audio information may fill the beginning of the buffer. The audio control system may continue its designated operation and repeat the refreshing process until an audio signal tone is detected that initiates an alternative action or operation. In some embodiments, the audio control system will continue to refresh and evaluate the windowed audio buffer for a distinct second audio signal tone after taking an action based on the first detected audio signal tone.

In some embodiments, the windowed audio buffer is processed through a noise removal system. The noise removal system may filter out some or all irrelevant noise captured by the audio input device. In some embodiments, the noise removal system may include an adaptive frequency and intensity filter. In some embodiments, designated band-pass filters set around select tones may be used. In some embodiments, the noise removal system may include a trained neural network filter. Embodiments of the noise removal system may include multiple distinct filters. The multiple filters may operate in parallel to create distinct noise-filtered data.

In some embodiments, the windowed audio buffer is processed through a frequency detection system. The frequency detection system may include a multi-tone frequency analyzer in some embodiments to determine if the detected frequencies match one or more frequencies of an audio action signal. In some embodiments, the frequency detection system may include a trained neural network for frequency detection. Embodiments may include multiple frequency detection options. In some embodiments with multiple frequency detection options, the frequency detection system may include a detection confidence consolidation system to aggregate the detection determinations and a confidence rating for the detection.

In some embodiments, the frequency detection system may follow a noise detection system. The frequency detection system may receive parallel noise-filtered data feeds from a multi-filter noise removal system in some embodiments. In such embodiments, each detector within the frequency detection system may receive and analyze each of the parallel noise-filtered data feeds. In some embodiments, each detector may form a combined detection and confidence output from the parallel noise-filtered data feeds. In other embodiments, each detector may send distinct detection and confidence outputs for each of the parallel noise-filtered data feeds to the detection confidence consolidation system for aggregation.

Embodiments of the audio detection system may include a voting system to determine if an action signal has been detected in the windowed audio buffer. In some embodiments, the voting system determines whether an action signal is detected based on a detection indication and confidence received from a frequency detection system. In some embodiments, the detection indication and confidence level may be compared to a designated threshold level for the determination.

In some embodiments, the audio signal system may only be used for a specific action, such as an emergency stop. In such embodiments, the audio detection system may be tailored to search solely for the defined tones for the specific audio signal.

In some embodiments, the audio control system may allow for multiple assigned action signals. In such embodiments, the audio control system may include multiple detection features tailored to separate defined signals. In some embodiments, the detection system may be designed to identify specific tones and intensities, which may be correlated with actions in an automation control system.

In some embodiments, an automated machine may conduct an autonomous field operation, such as terraforming, until an action signal is identified through an audio detection system. Once the action signal is identified, the automation control unit may determine the applicable action based on the identified signal characteristics in some embodiments. In other embodiments, the automation control unit may receive a specified signal from the audio detection system indicating the action.

In some embodiments, the operational area may include a plurality of machines that each have an audio control system and automation control unit. Multi-machine embodiments may use overlapping action controls, wherein each machine includes the same action for certain action signals. In some embodiments, machines may include machine specific action controls. Embodiments may also include a mix of fleet control signals and machine specific signals. In some embodiments, machines from different fields or work areas within a proximity may be distinctly assigned action signals to avoid interference.

In some embodiments, the working machines include one or more operation implements. The implements may also be controlled by the machine's receipt of an audio action signal. In some embodiments, an implement may include an audio detection system and an implement automation control system separate from the machine system.

In some embodiments, the audio signaling system may include a training, calibration or set-up feature. A training system may operate with or as part of the machine's audio control system. The control hub may also include a training program that provides a specific series or set of audio tones over a training period. During a training session, the audio control system may conduct audio signal detection for the training tones. These detections and frequency ranges, including any frequency drift, from the actual system may be stored or used to define subsequent tones. In some embodiments, the audio control system may use the training session to tune or train noise removal systems. In some embodiments, the automated machine may be configured to navigate portions of the working area during the training session. In some embodiments, the training or calibration feature may automatically initiate the first time a machine enters an area. In some embodiments, the training or calibration is initiated every time or periodically upon entering an area.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
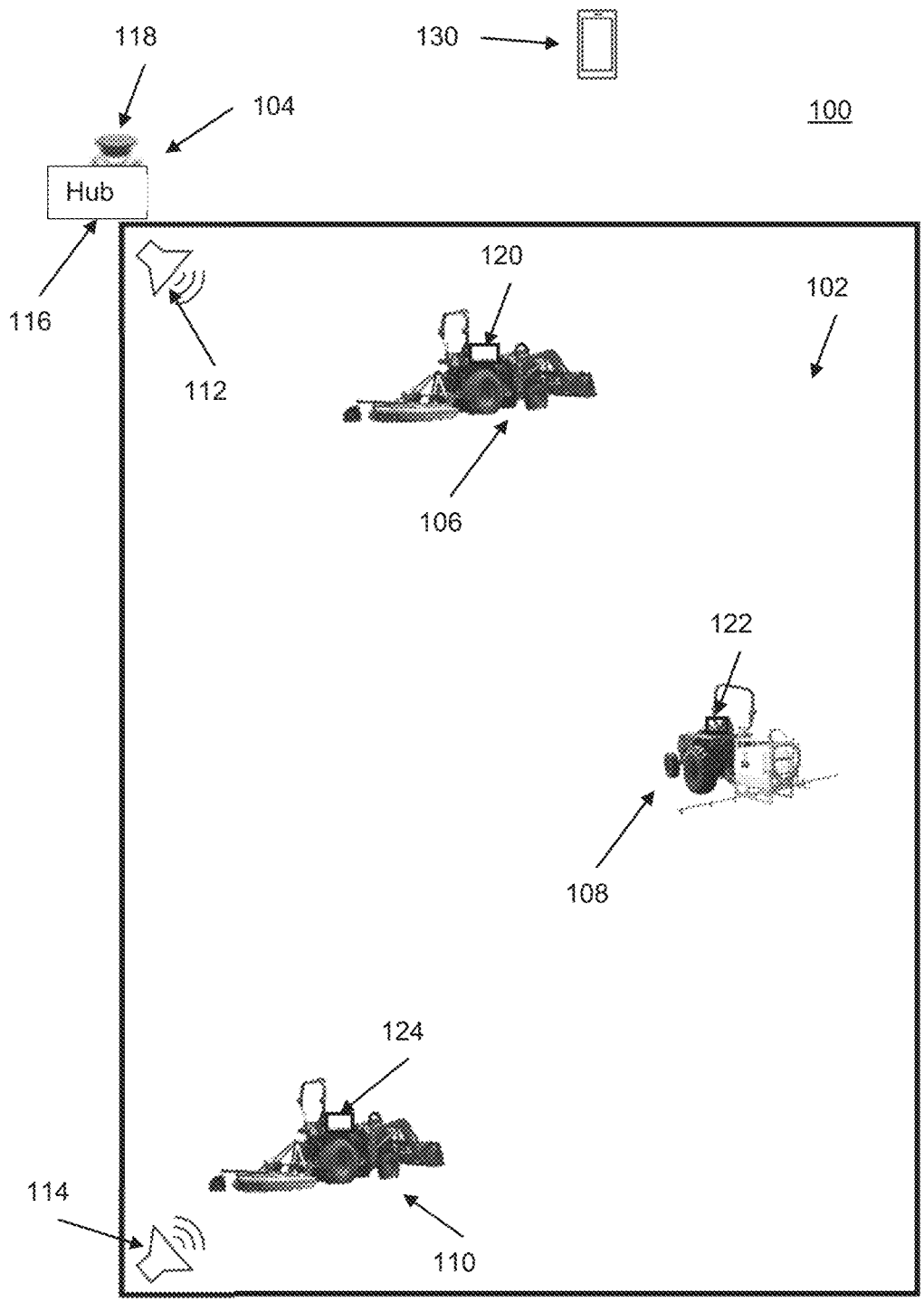
FIG. 1 is an embodiment of a system application.

FIG. 1 shows an audio signaling system 100 implementation for a field 102. This is an illustrative environment for discussion purposes. The audio signaling system 100 may be implemented in any number of environments, such as agriculture fields, mining sites, terraforming sites, building or construction sites, etc. In this embodiment, the audio signaling system 100 includes a field audio system 104 and audio control systems 120, 122 and 124, which are respectively on working machines 106, 108 and 110. Each machine may include an automation control system, such as an electronic control unit, operatively connected to actuators, sensors and other equipment to autonomously operate the machine. In some embodiments, the automation control unit is integrated with the audio control system 120, 122 and 124. For example, the automation control system and audio control system may share the same computer system with processors, microcontrollers, memories and other structural components for the management and operation of the systems.

In this embodiment, the field audio system 104 includes a control hub 116 with a physical control 118 and two speakers 112 and 114. In some embodiments, multiple control hubs 116 may be included in the field audio system 104. For example, each speaker 112 and 114 may be associated with a control hub 116. The plurality of control hubs 116 may be synced through wired or wireless connection to provide synchronized audio outputs across the field 102. In some embodiments, the control hubs 116 may use audio, visual or other indication systems to initiate a synchronization over the area. In such cases, the control hubs 116 may include appropriate audio or visual sensors to receive the sync indication.

In some embodiments, field audio system 104 does not include a control hub 116. For example, the field audio system may be solely controlled by the physical control 118 operating to manually initiate an audio signal. In such embodiments, the physical control 118 may be a button, switch or other mechanism to turn the audio speakers 112 and 114 on or off. In some embodiments, the system may include a lead machine that can operate as a control hub. In such cases, the lead machine may include alternative communication systems to receive control signals wirelessly and one or more speakers to initiate audio signals for the fleet.

In some embodiments, the physical control 118 operates as the user interface for the control hub 116. The control hub 116 may be a computer system, server, controller, switchbox or other control system. The control hub 116 may include a user interface for certain operations in addition to the physical control 118. For example, the control hub 116 may include a user interface for selecting audio tones for action signals in addition to having the physical control 118 connected to provide an emergency action signal. In such embodiments, the physical control 118 may be preprogrammed for an emergency stop audio signal while the control hub 116 user interface allows a user to issue a return audio signal, an operation pause audio signal or other signal. In some embodiments, the physical control 118 may include a series of programmable controls that are defined for certain actions, such as fleet return instructions, pause fleet instructions, start fleet instructions and/or other instructions.

In some embodiments, the control hub 116 does not include a physical control 118 separate from a user interface for the control hub 116. The control hub 116 may include an onboard user interface such as a keypad, keyboard, mouse, touch screen, voice control or other local user interface system. In some embodiments, the control hub 116 may include a wired or wireless communication module. Those skilled in the art will recognize that the communication systems and communication modules are a known class of structures that provide communication capabilities, and include communication chipsets, antennas and other known structures. As an example, the control hub 116 may include a cellular communication module to provide long-range communication and a Bluetooth communication module to provide local communications.

The communication system in the control hub 116 may allow remote instructions to be received. In some embodiments, the communication system may also receive selected data feeds, such as weather service information. In some embodiments, the control hub 116 may include a communication monitor, which confirms receipt of one or more communication feeds. If a designated communication feed stops, the control hub 116 may have an automated instruction for the fleet. For example, if the control hub 116 uses a safety channel through an LTE communication, the control hub 116 may initiate an automated audio stop signal if the LTE feed stops.

In some embodiments, the control hub 116 may include additional sensors. For example, the control hub 116 may include weather gauges to monitor local conditions. As another example, the control hub 116 may be associated with a camera system that monitors the field and provides a visual warning system. The visual warning system may be automatically analyzed for risk within the control hub 116 or sent to a monitoring station, where an analysis computer or a remote monitoring user may monitor the visual feed for potential risk or reasons to initiate an audio instruction signal.

In the embodiment shown, the control hub 116 may receive instructions from the mobile phone 130, which acts as a remote user interface for the control hub 116. The mobile phone 130 may include an application that syncs with the control hub 116. The user may then select a desired action from the mobile phone 130, which will cause the control hub 116 to initiate the appropriate audio signal for the action. In addition, the mobile phone 130 may facilitate programming the control hub 116 to provide audio signals to select actions available on the machines 106, 108 or 110.

In some embodiments, the mobile phone 130 may be used as the sole user interface for the control hub 116. In such embodiments, the control hub 116 may operate as a pass-through relay to initiate selected signals.

Once an instruction or action is selected or triggered, the control hub 116 initiates the corresponding audible tone output through the speakers 112 and 114. The speakers 112 and 114 may be connected to the control hub 116 through a wired or wireless system. In some embodiments, the speakers 112 and 114 may include integrated control hubs 116. Such designs may simplify implementation through fewer components to install.

The control hub 116 may send initiation signals to each speaker 112 and 114 to cause each speaker to emit the selected audio tones for an audible action signal. For example, an emergency stop signal may cause the speakers 112 and 114 to immediately emit the signal's audio tone. As another example, the control hub 116 may initiate a return to staging signal using multiple tone frequencies.

In some embodiments, the control hub 116 continues to send the signals for a set period of time for the speakers 112 and 114 to output. In other embodiments, the speakers 112 and 114 may include onboard memory or signal loops to control the timing of the audio output. For example, receiving an action signal may cause the speakers 112 and 114 to emit the audio tones for 5 or 10 seconds. Embodiments may also include a repeat memory to cause the same audio tone output to be repeatedly issued over a set period.

The audio emitted from the speakers 112 and 114 may be received and analyzed by the audio control systems 120, 122 and 124. Each audio control system 120, 122 and 124 determines the action signal emitted from the speakers 112 and 114, which is used by the automation control unit to conduct the action associated with the audio signal.

In this embodiment, the working machines 106 and 110 are illustrated as tractors with a front loader and a trailing mowing implement. The working machine 108 includes a trailing sprayer implement in this embodiment. For purposes of this discussion, the working machines 106 and 110 are autonomously and collaboratively mowing the field 102 while the working machine 108 sprays the field 102 with a liquid fertilizer. As those skilled in the art will recognize from the description, the audio signaling system 100 may be applied to any number and type of working machines, with variation on potential actions depending on the working machine's capabilities and features.

During operation, the audio control system 120, 122 and 124 for each working machine 106, 108 and 110 listens for audio action signals by repeatedly receiving and evaluating environmental audio through one or more microphones or other audio input devices. In some embodiments, the microphone is integrated with the housing of the audio control system 120, 122 or 124. In some embodiments, the microphone or microphones are attached to one or more locations on the frame or housing of the working machine 106, 108 or 110, and are operatively connected to the audio control system 120, 122 or 124. In some embodiments, one or more microphones used by the audio control system 120, 122 or 124 may also be part of a sensor system of the automation control system.

In some embodiments, multiple field audio outputs may be synchronized through emission signals from the control hub 116. The emission signals may include synchronization data for the field audio output to account for any period specific tone signals. For example, the speaker 112 may include an onboard delay to account for signal travel time to speaker 114. As another example, each of the speakers 112 and 114 may include synchronized clocks and begin emitting audio at a set delay after the initiation signal's timestamp.

For period specific signals, the onboard audio control systems 120, 122 and 124 may record and timestamp when certain frequencies are first detected and last detected to estimate the output period for the tone. The audio control systems 120, 122 and 124 may determine the period output is met based on a level of correlation to account for variations in the initial and final tone intensity and sampling rate. For example, if a five second audio signal is expected, the audio control systems 120, 122 and 124 may recognize the audio signal based on 4.5 seconds of tone recognition.

For repetitive signals, such as a signal that turns on and off at a set rate, the audio control systems 120, 122 and 124 may record initial tone recognition and track the time from when the tone quits being recognized until it returns. In some embodiments, the audio signaling system 100 may use specific tone patterns to communicate instructions to specified machines. For example, the field audio system 104 may issue a first tone for three seconds followed by a second tone for 1.5 seconds. The audio control system 124 may recognize the first tone as indicating the instruction is for machine 110 and the second tone is indicating a return to staging instruction. The audio control systems 120 and 122 may not recognize the first tone or recognize that it is not applicable to the machines 106 or 108. Mixed tone signals may be used to facilitate machine-specific or other specialized actions. As those skilled in the art will recognize, other audio signal types, protocols and variations may be implemented to vary action control options and allow different machines to be independently controlled.

In some embodiments, a user or automated system may provide machine identification information to the control hub 116 to facilitate specialized instruction options. For example, a control hub 116 may be associated with a series of access point sensors or communication components that register all machines 106, 108 and 110 entering and exiting an area with the control hub 116. As another example, the user may select machine types and operation capabilities through a mobile phone application that communicates with the control hub 116. This association ensures that the action signals issued by the control hub 116 are recognizable by the machines 106, 108 and 110.

In some embodiments, an optical signaling system may be included as a redundant or alternative instruction signaling system. The optical signaling system may operate in a substantially similar manner as the audio signaling system. The field audio system may use optical outputs, such as lights, infrared beams, lasers or other optical outputs, in a similar operation of the audio output. The machines may include an optical input, such as a camera, infrared sensor, light-sensitive sensor or other optical input, in a similar operation to the audio input. If the control hub 116 issues an instruction signal, lights may emit a pattern or specific color associated with the instruction for the machines to observe. A camera on the machines may observe the light output and the analysis system may evaluate whether the light output corresponds to an instruction. If it does, the machine automation system may conduct the instructed action.

Figure 2:
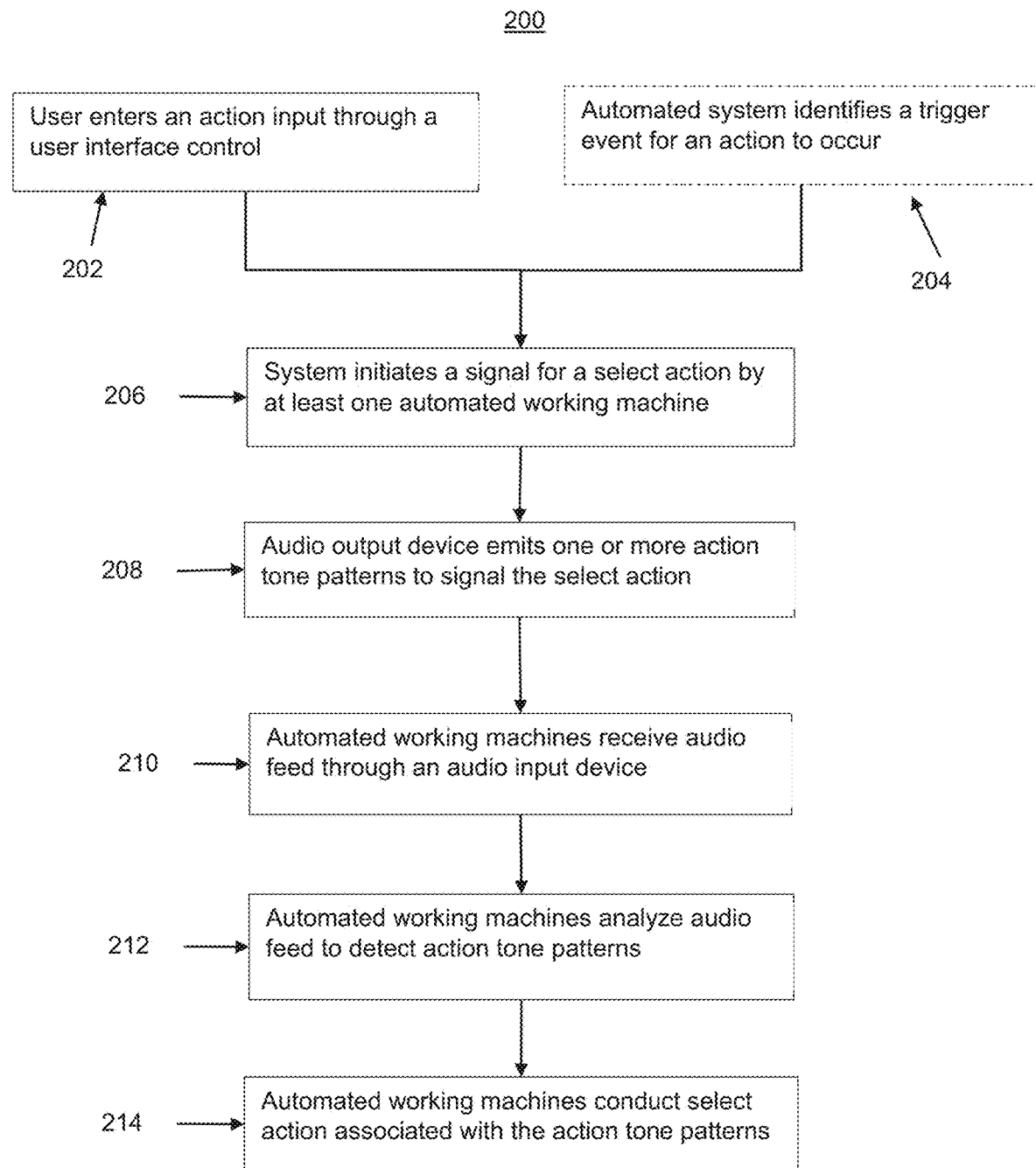
FIG. 2 is an embodiment of a system operation flowchart.

FIG. 2 provides an audio signaling system flowchart 200 walking through an example of an action selection, audio signaling and machine response to the action signal. This process may occur at any point during the automated operation being conducted by the working machine. For example, a series of working machines may be following a mission plan to fertilize a crop field. The machines will continue following the mission plan instructions until an alternative instruction or trigger modifies the operation.

In box 202, a user enters an action input through a user interface control. For example, a user may enter an instruction for an immediate stop in a keypad for a field system control hub. The user interface control may be any number of user control features, such as physical controls (e.g., buttons, switches, knobs, etc.), touch screen controls, voice activated controls, remote controls (e.g., remotely connected mobile phone application interface, etc.) or other user control features.

In some embodiments, the user may be required to meet an authorization security protocol to enter instructions. For example, a user may be required to enter an access code to activate the control hub. As another example, the control hub may include a short-range communication system, such as Bluetooth, that will synchronize with a user's phone to confirm an authorization key as the user approaches. In such an embodiment, authorization will not create a delay in initiating an emergency audio signal instruction. In another embodiment, the control hub may authenticate an operator-controlled machine that enters the field to permit instructions from that machine's onboard system to enter instructions to the audio signaling system. In some embodiments, emergency instructions may be available without authorization while other actions require authorization.

Box 204 illustrates an optional embodiment that allows automated systems to identify a trigger event for an action to occur without user input. For example, the control hub may include a weather feed over a communication channel from an external source or have attached weather sensors. If the weather information indicates an unsafe operating condition, the control hub may identify a safety action in response. For example, if a tornado report is identified, the control hub may identify a return to storage or staging instruction. As another example, if a wind sensor indicates a high wind condition and the machines include a sprayer, the control hub may identify an operation stop or reduction instruction. As yet another example, a temperature sensor at a construction project may indicate that concrete may not be poured without risk, and the control hub may initiate a warning signal to concrete machines to complete a section and stop pouring new concrete.

In some embodiments, the control hub may be connected to a camera system, which allows visual monitoring of the fleet in operation. The visual monitoring may be analyzed and automated triggers may be initiated based on observations. For example, if the camera system analysis determines current machine headings and movement will result in a wreck, the control hub may initiate an audio signal instruction for one or more vehicles to pause or stop to avoid collision. As another example, the camera system may include thermal, infrared or other capabilities that will allow the camera system analysis to identify other potential risks for the fleet operation. For example, if the camera system analysis identifies an unexpected heat source in the field, the system may trigger an emergency stop. In some embodiments, a camera system may be operated by a remote monitoring system or person to observe the field. In such embodiments, the remote monitor may remotely initiate instructions through communication with the control hub.

In box 206, the field control system initiates a signal for the selected action for at least one automated machine. For example, the control hub may send a signal with designated audio tones to cause an operation stop for the machines present on the field. The signal may be machine specific using distinct designated tones for certain actions in some embodiments. Other signals may be fleet specific. For example, the signal may call for a field tone at one frequency and an action tone at a second frequency so that only machines in the designated field will take the action requested.

In box 208, the audio output device emits one or more action tone patterns to audibly signal the selected action. For example, a speaker may emit the action tone pattern consistent with the signal received from the control hub for the action. The action tone pattern may be one or more select audio frequencies, which represent an action. In some embodiments, the action tone pattern may be a single frequency output. In other embodiments, the action tone pattern may be a combination of frequencies that are output. These may be output simultaneously, such that both must be present in the same window to indicate the action. In other embodiments, the multi-tone frequencies may be provided in a pattern such that they must be identified separately but within a defined period.

In box 210, the automated working machines receive an audio feed through an audio input device. For example, during the automated project operation, the working machine's audio control systems receive audio feeds through a microphone. The audio feed may be continually collected throughout the project operations. In some embodiments, this monitoring may include pre- and post-project steps, such as staging, return to home, or other actions.

In box 212, the automated working machines analyze the audio feed to detect action tone patterns. For example, audio control systems analyze the incoming audio feed to identify tones associated with one or more action signals. Any associated tones or combinations of tones may be compared to stored action signal tones to determine if a match has been detected.

If a match is detected by the analysis, the automated machines conduct the select action associated with the action tone pattern in box 214. For example, if the action tone pattern is correlated with an immediate stop, the automated machine's automation control system will initiate an immediate stop through electronic and mechanical control systems. For example, the automation control system may initiate immediate braking and PTO shutoff for a mowing machine, followed by shutting down engine operation. In some embodiments, the system may shut off electrical systems apart from the audio control device, which may remain active to await any further instructions.

In some embodiments, the audio signaling system may incorporate spread spectrum techniques for sending and receiving audio signals. The audio output device emits a known reference noise on a constant or regular basis. The reference noise may be a pseudorandom noise that is identified in the audio signaling system. When a signal is initiated for an action, the control hub superimposes the action signal with the known reference noise. The action signal may be a low bit rate signal indicating the action instructed. The emitted sound will comprise the underlying reference noise with the action signal superimposed.

The audio input devices receive audio, and the working machines analyze the audio to identify the known reference noise, which may be used to correlate the working machine with the output from the audio output device. In some embodiments, the correlation may include relative location determination. For example, the system may use a spread spectrum sound-based local positioning system that includes a Doppler shift compensation system to account for signal changes in the environment. As such, the system may improve communication and location awareness using a spread spectrum technique for correlation. In some embodiments, the location awareness may trigger a relay operation to expand the system's range.

During operation, the working machine's audio control systems continue to correlate with the known reference noise and evaluate the audio to identify whether an action signal is superimposed therewith. In some embodiments, the audio control system may compare the received audio to the known reference noise to determine when a difference occurs. When a difference is identified, the audio control system processes the audio signal to remove the known reference noise from the received audio, leaving any superimposed audio signal. The audio control system then compares the determined superimposed audio signal to action signals to determine if the signal correlates to an action signal.

In some embodiments, the audio signaling system may associate different pseudorandom noise outputs with different selective options, such as fleet controls, field identities or other group options. In such embodiments, an automated machine for a field will receive the pseudorandom noise information for the selected field and correlate with the audio output providing the corresponding pseudorandom noise. The use of a known pseudorandom noise for field identification may avoid interference from other audio output systems in the area that are using distinct pseudorandom noise.

Figure 3:
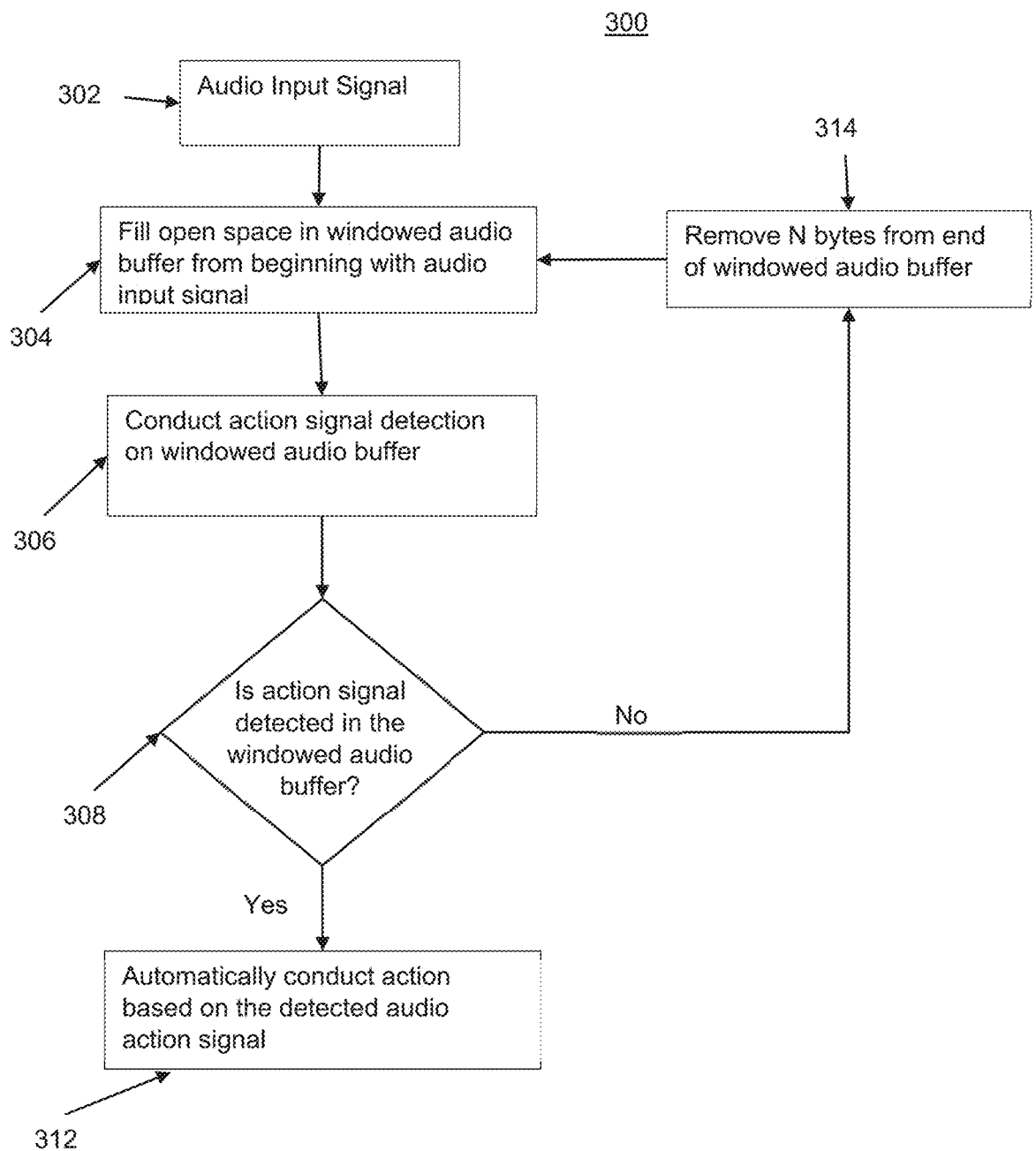
FIG. 3 is an embodiment of an audio control system operation flowchart.

FIG. 3 shows a more detailed flowchart of an embodiment for a signal detection process 300. This embodiment's signal detection process 300 implements a looping windowed audio buffer for the analysis within the audio control system. The windowed audio buffer may be designed to hold enough data for a signal detection review while limiting size to manage efficiency and necessary components. For example, the windowed audio buffer may be designed to hold 3.5 times the audio data collected over the system's longest audio signal. In other embodiments, the windowed audio buffer may be correlated to the necessary evaluation time.

In some embodiments, the system may include multiple windowed audio buffers. Each windowed audio buffer may correspond to a system microphone or other audio input. In some embodiments, the audio control system may split incoming audio signals into audio bands or intensities for further evaluation in different windowed audio buffers. For example, the audio input may pass through multiple parallel bandpass filters that capture a limited selection of frequencies for separate windowed audio buffers.

The process 300 begins with receiving the audio input signal in box 302. In some embodiments, this audio input signal is a digitally converted signal corresponding to the audio received through one or more microphones. In other embodiments, an analog audio signal may be received.

In box 304, the open space in the windowed audio buffer is filled from the beginning with the audio input signal, which may be digital or analog. The audio input will fill the buffer in real-time or near-real-time allowing efficient response time to identified signals. In an initial stage, the open space may be the full buffer. During operation the open space may correlate to the space available from sections deleted from the end of the buffer. In some embodiments, the complete frequency spectrum received is temporarily stored in the windowed audio buffer. The windowed audio buffer may be a first-in, first-out (FIFO) buffer that continually pushes the data through the buffer until it is removed.

In box 306, the system conducts an action signal detection on the windowed audio buffer. For example, the system may pull the audio feed for a certain number of bytes and conduct frequency analysis to identify which frequencies are present in that section of audio. The analysis may also determine the intensity of any detected frequency.

In some embodiments, the evaluation may be based on sampling analysis of isolated snippets of the audio. In such an embodiment, the sampling period is sufficiently smaller than any minimum tone length of an audio action signal used by the system. For example, if the shortest action signal tone is one second, the sampling period may be less than one second to ensure a sample would occur within the window for any action signal. The period may be designed to occur significantly more often to increase redundancy and limiting analysis errors due to a single potential capture of an action signal. For example, if the sampling period is 0.1 second, the system would have ten opportunities to identify the action signal lasting for one second. Even if the tone is not captured in the leading or trailing samples, the likelihood of identifying it in the middle samples remains high.

In decision box 308, the audio control system determines whether the action signal is detected within the windowed audio buffer. If the evaluation determines that a select audio tone is present in the audio input signal, the process continues to box 312. If the audio tone is not present, the process continues to box 314.

In box 312, the working machine automatically conducts the corresponding action based on the detected audio signal. For example, the automation control system may initiate a return to staging process based on the receipt of a detected tone pattern. The return to staging process may include shutting off operational components, such as implements, mowers or other features, and selecting and following an egress path to the staging point.

If an action audio signal for the working machine is not detected, the audio control system removes N-bytes from the end of the windowed audio buffer in box 314. This opens space for the audio input to fill the windowed audio buffer in box 304, which creates a looping evaluation of the audio feed until an action signal is detected. The total number of bytes—N—removed from the end of the windowed audio buffer may be defined based on the potential audio action signal's time and complexity, the evaluation sampling technique and period, the total windowed audio buffer size and/or other information.

While the looping portion is discussed in bytes for this embodiment, the N-bytes may correlate to the audio collected over a specific amount of time. For example, the windowed audio buffer may replace three seconds of audio data during each loop. The N-bytes may vary for each replacement due to the type and amount of data captured in each three second clip.

As another option, the audio control system may maintain clip sections representing a subset of the audio feed and flag clip sections once they are reviewed. The loop process may remove all clip sections that have been flagged. In some embodiments, the audio control system may also flag action signals detected to store the audio clips for later review. In some situations, any action clip flagged may also cause a selection of clips on each side to be saved. Those skilled in the art will recognize that the looping characteristics may be defined by time, bytes, flags or other features.

In some embodiments, the audio loop will continue even when an action signal is detected and the automated action is occurring. In such embodiments, the audio detection process will proceed from box 312 to box 314.

Those skilled in the art will recognize that other processes may be used to create a repetitive evaluation of an audio feed. For example, the audio signal may be split into time-based sections and feed into separate buffers that are independently evaluated and then erased and refilled.

Figure 4:
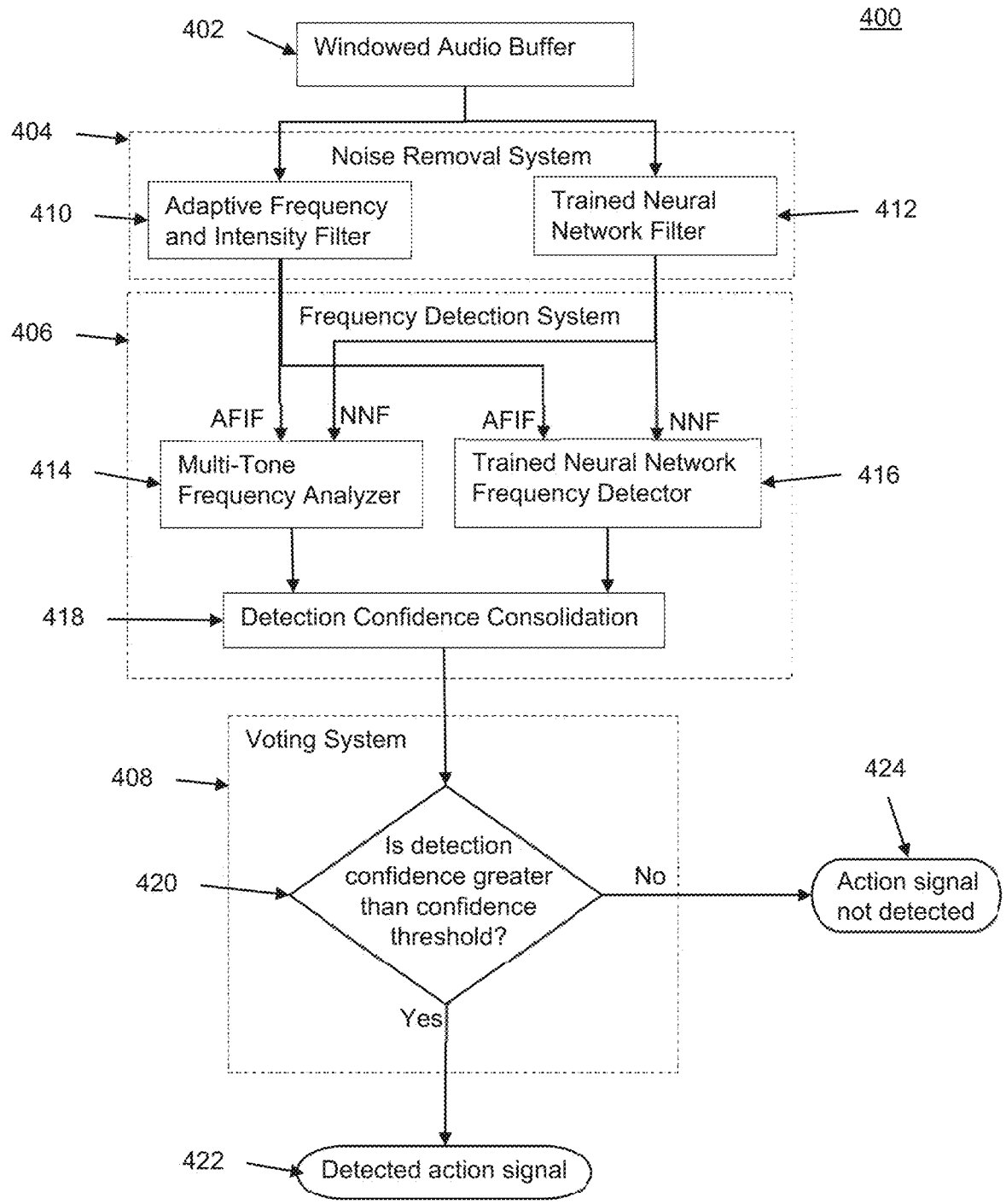
FIG. 4 is an embodiment of an audio detection operation flowchart.

FIG. 4 illustrates an embodiment of the audio signal detection system 400, which may be used within the audio control system. The audio signal detection system 400 begins with the windowed audio buffer 402, which includes a portion of recently received audio from an audio input signal. The windowed audio buffer 402 is regularly updating and the evaluation repeats with each update. For discussion, the operations of the audio detection system 400 are limited to a single pass. Those skilled in the art will recognize that the operations may be repeated as long as the audio is updating in the windowed audio buffer 402. In some embodiments, multiple audio signal detection systems 400 may be operating in parallel. For example, some embodiments may include independent audio signal detection systems 400 associated with each of a plurality of audio input devices.

In this embodiment, the audio signal detection system 400 includes a noise removal system 404, a frequency detection system 406 and a voting system 408. As a summary, the audio detection system 400 begins with the section of audio from the windowed audio buffer 402 and filters out unwanted background noise and irrelevant additional audio. The remaining audio is processed to detect the specific frequency or frequencies relating to an action signal. Finally, the frequency detection determination is compared to an expectation threshold to decide whether to qualify a finding as an actional detection.

In this embodiment, the noise removal system 404 includes two filters to remove noise from the audio in parallel, including an adaptive frequency and intensity filter 410 and a trained neural network filter 412. These filters operate as redundant options that remove noise from the audio and each provide a filtered audio output. In some embodiments, the noise-filtered outputs are different due to the filtration technology applied.

In some embodiments, the noise removal system 404 may use only one noise removal filter. In other embodiments, multiple noise removal filters may be used. Multiple noise removal filters may be in parallel or serial configurations. For example, a noise removal system 404 may include an adaptive frequency and intensity filter 410 followed serially by a trained neural network filter 412.

In this embodiment, the adaptive frequency and intensity filter 410 conducts one or more filtration techniques to remove irrelevant audio. The adaptive frequency and intensity filter 410 may include one or more bandpass filters that only allow specific audio frequency bands to proceed. The adaptive frequency and intensity filter 410 may include distinct bandpass filters associated with action signal frequency options. For example, if all the potential action signals only use frequencies at 150 hz, 275 hz, 400 hz and 700 hz, the adaptive frequency and intensity filter 410 may only include four specific bandpass filters with each designed to capture one of these frequencies. In some embodiments, the bandpass filters may capture audio within a band around the anticipated frequencies, such as a band extending 35 hz above and below the anticipated frequency.

In some embodiments, the adaptive frequency and intensity filter 410 may use a tunable bandpass filter that allows the audio control system to adjust the bandpass filter for different potential frequencies. As such, the audio control system may adjust the filter based on the tones used at different operational fields or areas. Similarly, the audio control system may adjust for the system's selected action signals for a specific machine. In such embodiments, the tunable bandpass filter may allow the system to prevent capturing action signals programmed in the machine that are not relevant for a given project.

In some embodiments, a tunable bandpass filter may be used to repeatably test specific frequencies in place of having distinct bandpass filters. For example, the bandpass filter may filter for a band around 100 hz on a first pass and then filter for a band at 250 hz on a second pass. The one tunable bandpass filter may make enough passes to capture all relevant bands to the potential action signals.

The adaptive frequency and intensity filter 410 may also include an intensity filter configured to eliminate signals at intensities that do not correspond to a potential action signal from the field audio system. The adaptive frequency and intensity filter 410 may remove audio that has too high an intensity or too low an intensity to define an applicable intensity band. In some embodiments, the intensity band may be correlated to the known audio output from the field audio system and a distance from the field audio output.

Once the audio is filtered in the adaptive frequency and intensity filter 410, it will output a filtered audio signal for further evaluation in the frequency detection system 406. The embodiment shown identifies the output of the adaptive frequency and intensity filter 410 as "AFIF."

The trained neural network filter 412 provides a parallel noise filter in this embodiment. The trained neural network filter 412 may evaluate the audio input to identify and remove audio that is not related to an audio action signal. The trained neural network filter 412 may require the optional audio action signal frequencies and intensities to evaluate what audio filtering may be applied to remove noise from an audio feed.

In some embodiments, the trained neural network filter 412 is built on a system trained with multiple audio feeds and filtered outputs designed to minimize irrelevant audio while avoiding the loss of relevant audio. The training may require parameters that must be met around these goals as well. In addition to generalized training from a data set, the trained neural network filter 412 or audio control system may be configured to gather known noise (e.g., machine operation noise, location ambient noise, etc.) for further training data, which may assist the trained neural network filter 412.

During operation, the trained neural network filter 412 may evaluate the audio in the windowed audio buffer 402 based on the machine learning conducted through training. In some embodiments, the type of audio in the windowed audio buffer 402 may cause variation in evaluation techniques within the trained neural network filter 412. Once the trained neural network filter 412 has removed irrelevant noise from the audio feed, the remaining audio is output as a filtered audio signal for further evaluation in the frequency detection system 406. The embodiment shown identifies the output of the trained neural network filter 412 as "NNF."

In this embodiment, the frequency detection system 406 includes a multi-tone frequency analyzer 414 and a trained neural network frequency detector 416 to conduct parallel frequency detection analysis. In addition, the frequency detection system 406 includes a detection confidence consolidation system 418 in this embodiment.

In some embodiments, the frequency detection system 406 may use only one frequency detector. In other embodiments, multiple frequency detectors may be used in parallel or serial configurations. In some embodiments, one or more frequency detectors may be integrated with noise removal systems. For example, the trained neural network filter 412 and the trained neural network frequency detector 416 may be integrated into a single trained neural network.

In this embodiment, each frequency detector 414 and 416 receives both filtered audio outputs AFIF and NNF from the two noise filters 410 and 412. Each of the frequency detectors 414 and 416 may conduct frequency detection analysis on each of the AFIF and NNF audio feeds. This cross-over analysis may improve overall effectiveness of the detection process by allowing the system to maximize benefits of multiple redundant systems for the analysis. For example, the trained neural network filter 412 followed by the multi-tone frequency analyzer 414 may provide better results for certain audio action signals in an environment. In other environments or for other tones, a different combination may provide better results.

The multi-tone frequency analyzer 414 may apply one or more processing techniques to identify frequencies present in the filtered audio sample. In some embodiments, the multi-tone frequency analyzer 414 may include a Fast Fourier Transform (FFT) spectrum analyzer to evaluate the audio sample and identify specific frequencies in the audio. Embodiments of the multi-tone frequency analyzer 414 may include one or more other analyzers instead of or in addition to an FFT analyzer. For example, some multi-tone frequency analyzers 414 may include a superheterodyne spectrum analyzer and a series of filter bank spectrum analyzers tailored to the relevant frequencies for audio action signals.

The multi-tone frequency analyzer 414 may then compare identified frequencies in the audio to frequencies found in the audio action signals. The multi-tone frequency analyzer 414 may output a series of identified frequencies, which correspond to an audio action signal, with a confidence level for the frequency identification. In some embodiments, the output may provide a confidence level for multiple potential frequencies, including a low or zero probability for frequencies that are not in the audio. In some embodiments, the multi-tone frequency analyzer 414 may output results for both the AFIF and NNF filtered audio samples.

The trained neural network frequency detector 416 may also analyze both the AFIF and NNF filtered audio samples. The trained neural network frequency detector 416 may receive a series of potential audio action signals for the evaluation along with the audio sample from the audio feed in the windowed audio buffer 402. The trained neural network frequency detector 416 may be configured to identify whether one of the audio action signals is identified and a confidence level for the determination.

The trained neural network frequency detector 416 may be built on a system trained to identify audio tones. In some embodiments, the training includes identifying specific audio tones from a noisy background. Like the training for the trained neural network filter 412, the system may be trained with a general audio training set. In some embodiments, the trained neural network frequency detector 416 may also be specifically trained for known environmental sounds and specified audio signal tones.

During operation, the trained neural network frequency detector 416 receives the filtered audio from the noise removal system 404 and conducts a frequency detection analysis. The frequency detection analysis may determine a likelihood that a specific action signal is detected in some embodiments. This may result in an action signal detection indication with a confidence level.

In some embodiments, the frequency detection analysis may identify multiclass frequency probabilities. For example, the trained neural network frequency detector 416 may output a confidence level that certain frequencies are present. In some embodiments, the multiclass probabilities may correlate confidence levels that audio is present at 100 hz, 200 hz, 300 hz, etc. In such embodiments, the detection confidence consolidation system 418 may correlate frequency confidences to potential action signals.

The collective outputs from the frequency detectors 414 and 416 are consolidated in the detection confidence consolidation system 418. In some embodiments, the detection confidence consolidation system 418 processes the detection information and confidence levels from the multi-tone frequency analyzer 414 and trained neural network frequency detector 416 to create a total confidence level for the presence of a specific action signal in the audio sample. The detection confidence consolidation system 418 output may provide confidence levels for one or more potential action signals. In some embodiments, each potential action signal may receive a confidence level, even if the confidence level is low or zero. In such embodiments, the detection confidence consolidation system 418 may insert or update confidence levels within an action signal table to be evaluated by the voting system 408.

In some embodiments, the detection confidence consolidation system 418 may include a weighting system in the calculation designed to favor certain outcomes, filters or detector options. For example, the multi-tone frequency analyzer 414's output for the NNF filtered audio may be weighted at 40% while the other three outputs are evenly weighted at 20%. The weighting factors may be assigned by a programmer, user or other person selecting options based on experience. In some embodiments, a trained neural network may develop the calculations and weighting factors for consolidation.

In some embodiments, the confidence levels from the frequency detectors 414 and 416 may be directed to specific frequencies. The detection confidence consolidation system 418 may consolidate confidence levels for each frequency into action signal presence confidence levels for multi-tone action signals. In some embodiments, each confidence level may be averaged for an overall confidence level for the action signal. In other embodiments, the detection confidence consolidation system 418 may limit the overall confidence level to the lowest confidence level for one of the frequencies. Yet other embodiments may use alternative consolidation parameters, such as weighting factors.

The detection confidence consolidation system 418 may provide the consolidated confidence level for one or more audio action signals to the voting system 408 for further evaluation.

In this embodiment, the voting system 408 conducts a threshold evaluation illustrated by the decision box 420. The voting system 408 determines if the detection confidence from the frequency detection system 406 is greater than a confidence threshold for an audio action signal. If the detection confidence from the frequency detection system 406 is greater than a confidence threshold, the audio signal detection system 400 determines that the action signal has been detected and issues a detected action signal as illustrated by output 422.

If the detection confidence from the frequency detection system 406 is less than a confidence threshold, the audio signal detection system 400 determines that the action signal has not been detected. The audio detection system 400 may issue an action signal not detected as illustrated by output 424. In some embodiments, the audio detection system 400 takes no action and does not issue an output when no audio action signal is detected.

In some embodiments, the detection confidence consolidation system 418 determines total confidence levels for each of a plurality of frequencies. The determination of the presence of an action signal may require a plurality of confidences for the voting system 408 for each potential action signal. The voting system 408 may require certain confidence levels for each required frequency in a multi-tone audio action signal in order to determine that an action signal is received.

In some embodiments, the voting system 408 may be omitted and the consolidated output includes the threshold determination for sending a detected action signal output.

In some embodiments, the audio signal detection system 400 may maintain a log of potential detections in a buffer. The log may include timestamps, frequency and confidence levels. As iterations of detection evaluations occur and are logged, the audio signal detection system 400 may update confidence levels for a signal based on the log information. For example, if a signal is identified with a low confidence level only on a first sample, the audio detection system 400 may reduce the confidence level. As another example, if a signal is identified with a confidence level below the voting threshold, the confidence level may increase when the same signal is persistently identified over multiple samples. This may be further increased if the audio detection system 400 looks further back in a log to see when the signal was clearly absent prior to the persistent identification. In some embodiments, machine detection logs may be stored with control hub output logs for further training and analysis. This data may be used by machine learning systems to improve predictions and detection in further applications.

The audio signal detection system 400 may be embodied within a single computer processing system with memory holding computer instructions and data storage, processors that implement the operations from the computer instructions and communication busses to other system components for operational control of the working machine, as well as input and output devices.

In some embodiments, the audio signal detection system 400 may include additional steps to identify and filter combined audio signals, such as an emitted reference noise with a superimposed audio signal. In such cases, the identification and removal of a known reference noise may occur at any time prior to action signal detection processing. For example, the reference noise may be removed from the audio signal prior to audio entering the windowed audio buffer 402, which may allow the machine to confirm correlation with the proper audio output device in parallel to action signal detection processing. In other embodiments, the known reference noise may be removed after ancillary audio filtration occurs in the noise removal system 404. In such cases, the filters 410 and 412 may be configured to remove noise that is not associated with the audio output, which leaves the known reference noise and any superimposed action signals. In yet other embodiments, the separation between the underlying known reference noise and any superimposed action signal may occur as part of the frequency detection analysis in the frequency detection system 406.

Figure 5:
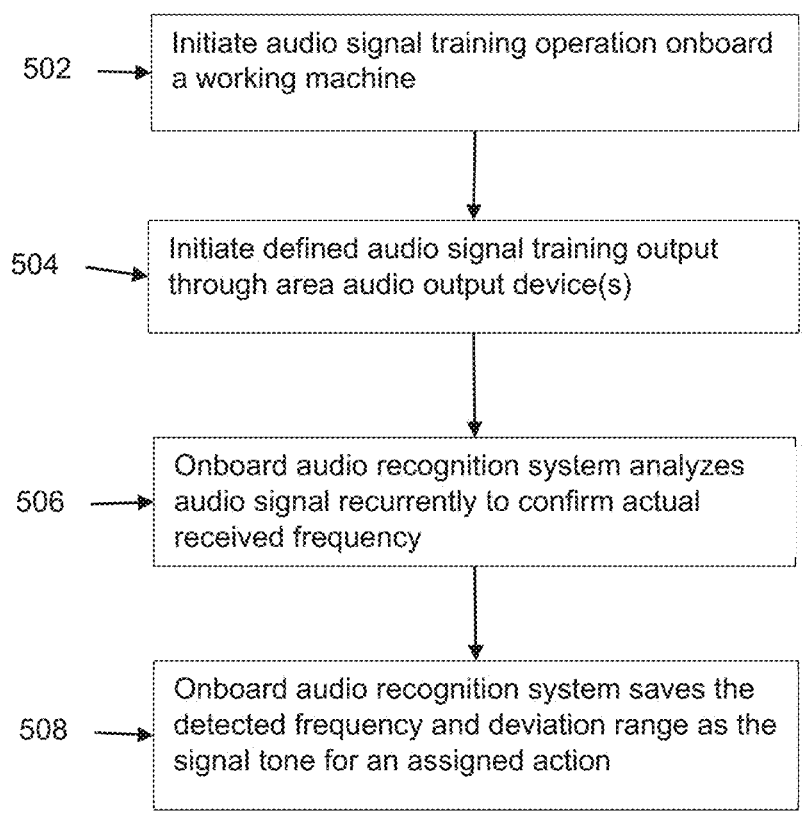
FIG. 5 is an embodiment of a training operation flowchart.

FIG. 5 illustrates a field training system flowchart 500 for an audio analysis system onboard a machine. Field training with the audio analysis system may be used to improve audio analysis by facilitating the analysis system capturing the action signal tones from the field audio system for comparative analysis during later evaluation. For example, the audio analysis system may determine that the field output for an expected 100 hz tone is consistently received as a 103 hz mean tone and can drift between 98 hz and 110 hz. The analysis system may therefor recognize during later operation that a 103 hz detected tone has a higher confidence of being the audio signal tone. In addition, the analysis system may include other frequency shifting features to account for field conditions or operational effects that modify an observed tone at the machine. For example, the analysis system may automatically shift anticipated frequency tones based on doppler effects relevant to the machines motion and speed.

In addition, the field training may allow the audio analysis system to capture and later differentiate background noise from the working machine and the environment. In some embodiments, this information may be used for neural network training systems or comparative processing systems. For example, the noise filtering neural network system may be taught to remove known background noise without interfering with the potential action signal tones.

In box 502, a user or the system may initiate an audio signal training operation onboard a working machine. For example, the machine may automatically initiate an audio signal training operation when entering a field. The audio signal training operation for an onboard audio control system uses the audio control system to receive and evaluate audio feeds. During the audio signal training operation, the audio control system will not take actions based on identified audio action signals. Instead, the detections will be recorded for analysis and training. In addition, the record of detections may be compared to a test output to ensure all signals are recognized.

In some embodiments, the audio signal training operation only occurs at an initial introduction to the field, a system update or a user selected recalibration. In some embodiments, the audio training process may be a periodic calibration process after an initial training, which occurs when the machine first arrives at the location. For example, this audio training process may be a standard calibration process, which occurs at the beginning of all projects. As another periodic example, the machine may calibrate weekly. In some embodiments, the initial audio signal training is more comprehensive than subsequent calibrations. For example, subsequent calibrations may only conduct a multi-tone test to ensure the received tones are consistent with previously recorded tones.

After initiating the onboard audio signal training, the user or the system initiates a defined audio signal training output through one or more area output devices in box 504. The defined audio signal training output may produce a pattern of action signal frequencies. In some embodiments, the audio signal training output may also provide a stepped pattern of frequency outputs for training in addition to action signal frequencies. The defined audio signal training output may be a set pattern anticipated by the onboard audio signal training. In some embodiments, the output pattern may be randomized to create a blind test for the onboard audio signal training. Some embodiments will use a multi-stage testing protocol that includes a predetermined pattern for tuning the onboard audio signal recognition system followed by a testing protocol that is randomized.

In box 506, the onboard audio recognition system analyzes audio signals recurrently to confirm actual received frequency. The received frequency is the frequency that the audio recognition system onboard a working machine identifies. In some embodiments, the received frequency may differ from the expected frequency. For example, if an audio speaker is not properly emitting the exact frequency selected, the onboard audio recognition system may receive the audio output that is not the exact selected frequency. As another example, if the audio intake system is not accurate or properly calibrated, the received audio may appear shifted during operation.

In some embodiments, the audio emitting devices, environment and/or other factors may cause frequency drift around the selected frequency. The recurrent testing may capture multiple frequencies around the selected frequency that may be correlated to the emitted audio. These multiple frequencies may be analyzed to determine the mean frequency and an expected or predictable frequency drift.

In box 508, the onboard audio recognition system saves the detected frequency and deviation range as the signal tone for an assigned action or frequency within an audio action signal. The saved frequency and deviation range may be used during operation to set noise removal and signal detection parameters. For example, a tunable bandpass filter may be configured to ensure the full deviation range is within the band.

In addition, the saved data may be used by the trained neural network to provide additional data points for improving analysis. The data may also be collected and sent for specific training in association with the selected field or area.

In some embodiments, the audio signal training may occur with the machine off to eliminate machine background noise for a period of testing. In some embodiments, the machine may be initiated to provide machine specific background noise for a period of testing. The testing system may include a predefined period without any area audio output device emitting audio to allow the audio recognition system to capture the machine's audio for noise removal or audio recognition and differentiation analysis.

In some embodiments, the audio signal training may occur with the machine at a set location. In other embodiments, the audio signal training may also include a corresponding mission plan for the automation machine. For example, the mission plan may require the working machine to travel around a field and conduct audio testing at diverse locations to learn variations in the emitted signal from different locations in the field. This testing may also ensure that audio signals may be recognized throughout the working area. This provides an additional security and safety assurance.

In some embodiments, the working machine may include implements or other accessories. These accessories may include separate audio control systems from the machine's system. The separate implement audio control systems may allow a field audio signaling system to cause implements to turn operations on or off apart from a machine's control.

In some embodiments, the machines or implements may also include other communication systems for wireless communication, such as cellular communication, Wi-Fi communication, Bluetooth communication, etc. The audio signal system may be used as an emergency, alternative or redundant system to these communication systems. In addition, audio signaling may be available in areas where other communication is unavailable, not permitted or less reliable. For example, some radio frequency bands are highly regulated and crowded with multiple signals that may cause interference preventing accurate communication in some areas.

In some embodiments, the machines and/or implements may include audio emitting components. The audio emitting components may be used to relay audio action signals received and detected by a machine. This may expand the capability of a field audio signaling system by allowing closer machines that could identify a signal faster to relay signals to machines further away. In addition, machines with audio emitting components may initiate audio action signals. For example, if one machine identifies an emergency, it may initiate an emergency stop audio signal for the other machines.

In some embodiments, a lead machine may be used that has a communication system in addition to the audio control system and an audio emitting component. In such embodiments, the lead machine may receive instructions through the communication channel, such as a satellite communication network, and relay the instructions through audio signals from the onboard audio emitting device.

In some embodiments, the system may include a semi-automated and/or a manually operated machine that incorporates an audio control system. In such embodiments, the audio control system may operate consistent with the automated machine operations to analyze and identify action signals. In some embodiments, the semi-automated machine or manual machine may include automatic operations to implement an action associated with the signal, such as an emergency stop. In some embodiments, the semi-automated machine or manual machine may provide warnings or other notices to an operator indicating the action signal identified in the signal. Embodiments of either machine may differentiate actions requested through the audio signaling system and respond automatically or with a warning based on the nature of the action requested. For example, an emergency action may cause the machine to automatically respond while an action associated with a weather risk may issue a warning to allow the user to decide how to proceed.

Most of the equipment discussed above comprises hardware and associated software. For example, the typical working machine is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media.

Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

The invention being thus described and further described in the claims, it will be obvious that the same may be varied in many ways. Such variations are not to be regarded as a departure from the spirit and scope of the invention, and all such modifications as would be obvious to one skilled in the art are intended to be included within the scope of the apparatus described.

The invention claimed is:

1. An audio signaling system for an automated machine, comprising:
a field audio system, comprising
a control hub including a user interface, and
an audio output device connected to the control hub, wherein the audio output device emits an audio action signal when an action instruction signal is sent from the control hub;
an audio control system onboard the automated machine, comprising
an audio input device, wherein the audio input device captures audio including the audio action signal when it is emitted by the audio output device,
a control circuit connected to the audio input device, wherein the control circuit includes a memory connected to a processor, wherein the control circuit is connected to an automation system for the automated machine, wherein the control circuit evaluates the audio from the audio input device to determine if current audio includes the audio action signal, and when the current audio is determined to include the audio action signal, the control circuit sends corresponding action instructions to the automation system; and wherein during operation, the field audio system's control hub sends the action instruction signal to the audio output device when a user input is received through the user interface.

2. The audio signaling system according to claim 1, wherein the control circuit feeds the audio from the audio input device into an audio buffer within the memory and evaluates the audio buffer to determine if the current audio data within the audio buffer includes the audio action signal.

3. The audio signaling system according to claim 1, wherein the control circuit includes an audio recognition system having a noise removal system and a frequency detection system.

4. The audio signaling system according to claim 3, wherein the noise removal system includes an adaptive frequency filter and a neural network filter.

5. The audio signaling system according to claim 4, wherein the adaptive frequency filter and the neural network filter operate in parallel.

6. The audio signaling system according to claim 5, wherein the adaptive frequency filter creates an AFIF filtered audio output and the neural network filter creates an NNF filtered audio output.

7. The audio signaling system according to claim 6, wherein the frequency detection system includes a multi-tone frequency analyzer and a neural network frequency detector, and the multi-tone frequency analyzer evaluates both the AFIF filtered audio output and the NNF filtered audio output, and the neural network frequency detector evaluates both the AFIF filtered audio output and the NNF filtered audio output.

8. The audio signaling system according to claim 3, wherein the frequency detection system includes a multi-tone frequency analyzer and a neural network frequency detector.

9. The audio signaling system according to claim 8, wherein the multi-tone frequency analyzer and the neural network frequency detector operate in parallel.

10. The audio signaling system according to claim 1, comprising a plurality of automated machines, which each have one of the audio control systems.

11. The audio signaling system according to claim 1, wherein the audio output device emits a reference noise and the audio action signal is superimposed with the reference noise when the action instruction signal is sent from the control hub; and wherein the control circuit evaluates the audio from the audio input device to identify the reference noise and correlate the audio to the audio output device based on the reference noise.

12. The audio signaling system according to claim 11, wherein the reference noise is constantly output by the audio output device during operation and the audio control system maintains correlation to the field audio system based on the reference noise.

13. An audio control system onboard an automated machine, comprising:
a microphone, which captures audio,
a control circuit connected to the microphone to receive an audio feed of the captured audio and connected to an automation system for the automated machine, wherein the control circuit comprises:
a memory, and
a processor connected to the memory; and
wherein during operation, the control circuit evaluates the audio feed to determine if current audio includes an audio action signal received from a field audio system, which has an audio control hub and a speaker to emit the audio action signal;
wherein, if the audio action signal is detected, the control circuit correlates the detected audio action signal with action instructions stored in the memory; and
wherein the control circuit sends the action instructions correlated to the audio action signal to the automation system, which executes the action instructions.

14. The audio control system according to claim 13, wherein the control circuit loads the audio feed into a windowed audio buffer within the memory and evaluates the windowed audio buffer to determine if the current audio data within the windowed audio buffer includes the audio action signal.

15. The audio control system according to claim 13, wherein the control circuit includes an audio recognition system having a noise removal system and a frequency detection system.

16. The audio control system according to claim 13, wherein the automated machine is at least one of an agricultural vehicle or a construction vehicle; and the field audio system is applied to at least one of a field or a construction site.

17. The audio control system according to claim 13, wherein the field audio system initiates the audio action signal from the audio control hub based on at least one of a remote user interface or an automated system trigger event.

18. The audio control system according to claim 17, wherein the remote user interface is a mobile device application.

19. The audio control system according to claim 13, wherein the audio action signal is at least one of a multi-tone signal or a patterned signal.

20. The audio control system according to claim 13, wherein the audio action signal is selected from a plurality of potential audio action signals, which each correlate to different actions.

21. The audio control system according to claim 13, wherein the audio control system retransmits the audio action signal received from the field audio system when the audio action signal is detected.

22. An audio signaling system for a vehicle, comprising:
a field audio system, comprising
a control hub including a user interface, and
an audio output device connected to the control hub, wherein the audio output device emits an audio action signal when an action instruction signal is sent from the control hub;
an audio control system onboard the vehicle, comprising
an audio input device, wherein the audio input device captures audio including the audio action signal when it is emitted by the audio output device,
a control circuit connected to the audio input device, wherein the control circuit includes a memory connected to a processor,
wherein the control circuit is connected to an automation system for the vehicle,
wherein the control circuit evaluates the audio from the audio input device to determine if current audio includes the audio action signal, and when the current audio is determined to include the audio action signal, the control circuit sends corresponding action instructions to the automation system; and wherein during operation, the field audio system's control hub sends the action instruction signal to the audio output device when a user input is received through the user interface.

23. The audio signaling system according to claim 22, wherein the vehicle is at least one of an automated vehicle, a semi-automated vehicle or a manually operated vehicle.

24. The audio control system according to claim 23, wherein the automation system provides a warning corresponding to the audio action signal received.

* * * * *